United States Patent
Gupta et al.

(10) Patent No.: US 10,012,748 B2
(45) Date of Patent: Jul. 3, 2018

(54) RESOURCE PRODUCTION FORECASTING

(71) Applicant: Schlumberger Technology Corporation, Sugar Land, TX (US)

(72) Inventors: Siddhartha Gupta, Houston, TX (US); Franz Fuehrer, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 505 days.

(21) Appl. No.: 14/332,014

(22) Filed: Jul. 15, 2014

(65) Prior Publication Data

US 2015/0039544 A1  Feb. 5, 2015

Related U.S. Application Data

(60) Provisional application No. 61/860,832, filed on Jul. 31, 2013.

(51) Int. Cl.
```
G06N 3/02     (2006.01)
G01V 1/50     (2006.01)
E21B 43/00    (2006.01)
E21B 41/00    (2006.01)
```
(52) U.S. Cl.
CPC .............. *G01V 1/50* (2013.01); *E21B 43/00* (2013.01); *G06N 3/02* (2013.01); *E21B 2041/0028* (2013.01)

(58) Field of Classification Search
CPC ....................................................... G06N 3/02
USPC ........................................................ 706/21
See application file for complete search history.

(56) References Cited

U.S. PATENT DOCUMENTS

| | | | |
|---|---|---|---|
| 5,444,619 | A | 8/1995 | Hoskins et al. |
| 7,113,869 | B2 | 9/2006 | Xue |
| 8,280,709 | B2 | 10/2012 | Koutsabeloulis et al. |
| 2008/0140369 | A1 | 6/2008 | Rashid et al. |
| 2009/0020284 | A1 | 1/2009 | Graf et al. |

OTHER PUBLICATIONS

He et al ("Neural-Network Approach to Predict Well Performance Using Available Field Data" 2001).*
Dahaghi et al ("A new practical approach in modelling and simulation of shale gas reservoirs: application to New Albany Shale" 2011).*
Zaamout et al ("Improving Neural Networks Classification through Chaining" 2012).*
Hadjiiski et al ("Application of Artificial Neural Networks to Modeling and Prediction of Ambient Ozone Concentrations" 2000).*
Nguyen et al ("Applications of data analysis techniques for oil production prediction" 2005).*

(Continued)

*Primary Examiner* — Lut Wong
(74) *Attorney, Agent, or Firm* — Colin L. Wier

(57) ABSTRACT

A method can include providing a trained neural network; providing a set of production values where the set includes, for example, a cumulative production value for an interval, an average production value for the interval, a first production value for the interval and a last production value for the interval; and predicting at least one production value for a subsequent interval based at least in part on the trained neural network and the provided set of production values. Various other apparatuses, systems, methods, etc., are also disclosed.

14 Claims, 12 Drawing Sheets

(56) References Cited

OTHER PUBLICATIONS

Nguyen et al ("Prediction of oil weell production using multi-neural networks" 2002).*
Office Action for the equivalent Mexican patent application MX/a/2014/009200 dated Aug. 23, 2017.
Office Action for the equivalent Mexican patent application MX/a/2014/009200 dated Mar. 1, 2017.
Office Action for the equivalent Mexican patent application MX/a/2014/009200 dated Feb. 20, 2018.

* cited by examiner

RESOURCE PRODUCTION FORECASTING

RELATED APPLICATION

This application claims the benefit of U.S. Provisional Patent Application having Ser. No. 61/860,832, filed 31 Jul. 2013, which is incorporated by reference herein.

BACKGROUND

Resources may exist in subterranean fields that span large geographic areas. As an example, hydrocarbons may exist in a basin that may be a depression in the crust of the Earth, for example, caused by plate tectonic activity and subsidence, in which sediments accumulate (e.g., to form a sedimentary basin). Hydrocarbon source rock may exist in a basin in combination with appropriate depth and duration of burial such that a so-called "petroleum system" may develop within the basin. As an example, a basin may include some amount of shale, which may be of interest for shale gas exploration and production. Various technologies, techniques, etc. described herein may, for example, facilitate assessment of resources in a basin and development of a basin for production of such resources.

SUMMARY

A method can include providing a trained neural network and a set of production values. The set may include, for example, the cumulative production value for a given interval, the average production value for the interval, or the first and last production values for the interval. The method may also involve predicting a production value for a subsequent interval based at least in part on the trained neural network and the provided set.

A system can include a processor and memory coupled to the processor. Executable instructions stored in the memory may predict the production of a resource from a basin using input values and a set of trained neural networks. Each of the neural networks in the set may correspond to a different production interval for production of the resource from the basin. These instructions may be stored on computer-readable media. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter or given greater weight than other sections of the written description.

BRIEF DESCRIPTION OF THE DRAWINGS

Features and advantages of the described implementations can be more readily understood by reference to the following description taken in conjunction with the accompanying drawings.

DETAILED DESCRIPTION

The following description is not to be taken in a limiting sense, but rather is made merely for the purpose of describing the general principles of the implementations. The scope of the described implementations should be ascertained with reference to the issued claims.

Figure 1:
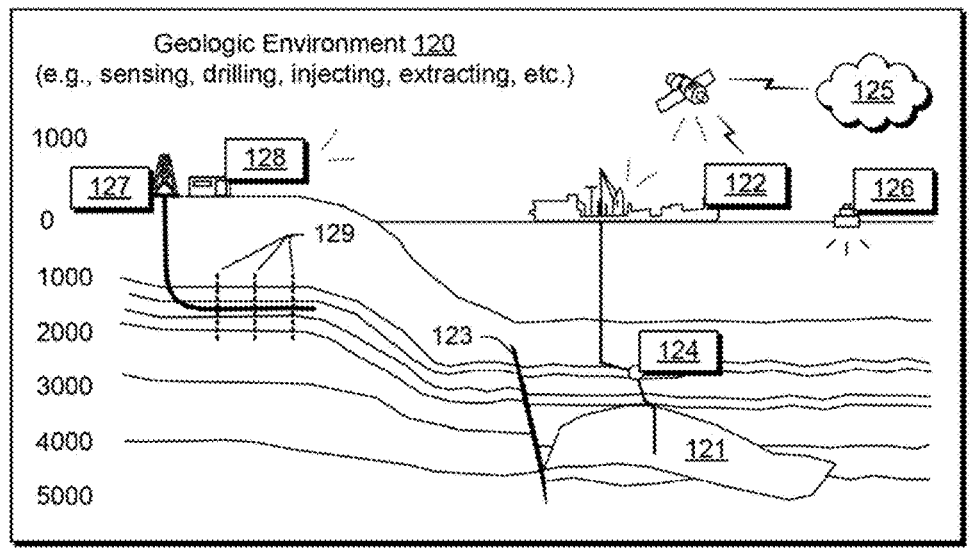
FIG. 1 illustrates examples of equipment in a geologic environment.

FIG. 1 shows an example of a geologic environment 129. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, etc. For example, FIG. 1 shows a satellite in communication with the network 125 that may be configured for communications, noting that the satellite may include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

Geologic formations such as in, for example, the geologic environment 120, include rock, which may be characterized by, for example, porosity values and by permeability values. Porosity may be defined as a percentage of volume occupied by pores, void space, volume within rock that can include fluid, etc. Permeability may be defined as an ability to transmit fluid, measurement of an ability to transmit fluid, etc.

The term "effective porosity" may refer to interconnected pore volume in rock, for example, that may contribute to fluid flow in a formation. As effective porosity aims to exclude isolated pores, effective porosity may be less than total porosity. As an example, a shale formation may have relatively high total porosity yet relatively low permeability due to how shale is structured within the formation.

As an example, shale may be formed by consolidation of clay- and silt-sized particles into thin, relatively impermeable layers. In such an example, the layers may be laterally extensive and form caprock. Caprock may be defined as relatively impermeable rock that forms a barrier or seal with respect to reservoir rock such that fluid does not readily migrate beyond the reservoir rock. As an example, the permeability of caprock capable of retaining fluids through geologic time may be of the order of about $10^{-6}$ to about $10^{-8}$ (darcies).

The term "shale" may refer to one or more types of shales that may be characterized, for example, based on lithology, etc. In shale gas formations, gas storage and flow may be related to combinations of different geophysical processes. For example, regarding storage, natural gas may be stored as compressed gas in pores and fractures, as adsorbed gas (e.g., adsorbed onto organic matter), and as soluble gas in solid organic materials.

Gas migration and production processes in gas shale sediments can occur, for example, at different physical scales. As an example, production in a newly drilled wellbore may be via large pores through a fracture network and then later in time via smaller pores. As an example, during reservoir depletion, thermodynamic equilibrium among kerogen, clay and the gas phase in pores can change, for example, where gas begins to desorb from kerogen exposed to a pore network.

Sedimentary organic matter tends to have a high sorption capacity for hydrocarbons (e.g., adsorption and absorption processes), Such capacity may depend on factors such as, for example, organic matter type, thermal maturity (e.g., high maturity may improve retention) and organic matter chemical composition. As an example, a model may characterize a formation such that a higher total organic content corresponds to a higher sorption capacity.

With respect to a shale formation that includes hydrocarbons (e.g., a hydrocarbon reservoir), its hydrocarbon producing potential may depend on various factors such as, for example, thickness and extent, organic content, thermal maturity, depth and pressure, fluid saturations, permeability, etc. As an example, a shale formation that includes gas (e.g., a gas reservoir) may include nanodarcy matrix permeability (e.g., of the order of $10^{-9}$ D) and narrow, calcite-sealed natural fractures. In such an example, technologies such as stimulation treatment may be applied in an effort to produce gas from the shale formation, for example, to create new, artificial fractures, to stimulate existing natural fractures (e.g., reactivate calcite-sealed natural fractures), etc. (see, e.g., the one or more fractures 129 in the geologic environment 120 of FIG. 1).

Shale may vary by, for example, one or more of mineralogical characteristics, formation grain sizes, organic contents, rock fissility, etc. Attention to such factors may aid in designing an appropriate stimulation treatment. For example, an evaluation process may include well construction (e.g., drilling one or more vertical, horizontal or deviated wells), sample analysis (e.g., for geomechanical and geochemical properties), open-hole logs (e.g., petrophysical log models) and post-fracture evaluation (e.g., production logs). Effectiveness of a stimulation treatment (e.g., treatments, stages of treatments, etc., may determine flow mechanism(s), well performance results, etc.

As an example, a stimulation treatment may include pumping fluid into a formation via a wellbore at pressure and rate sufficient to cause a fracture to open. Such a fracture may be vertical and include wings that extend away from the wellbore, for example, in opposing directions according to natural stresses within the formation. As an example, proppant (e.g., sand, etc.) may be mixed with treatment fluid to deposit the proppant in the generated fractures in an effort to maintain fracture width over at least a portion of a generated fracture. For example, a generated fracture may have a length of about 500 ft extending from a wellbore where proppant maintains a desirable fracture width over about the first 250 ft of the generated fracture.

In a stimulated shale gas formation, fracturing may be applied over a region deemed a "drainage area" (e.g., consider at least one well with at least one artificial fracture), for example, according to a development plan. In such a formation, gas pressure (e.g., within the formation's "matrix") may be higher than in generated fractures of the drainage area such that gas flows from the matrix to the generated fractures and onto a wellbore. During production of the gas, gas pressure in a drainage area tends to decrease (e.g., decreasing the driving force for fluid flow, for example, per Darcy's law, Navier-Stokes equations, etc.). As an example, gas production from a drainage area may continue for decades: however, the predictability of decades long production (e.g., a production forecast) can depend on many factors, some of which may be uncertain (e.g., unknown, unknowable, estimated with probability bounds, etc.).

Various shale gas formations have and are producing gas economically, which has widened interest gas production in other areas. For example, several shale gas exploration projects are under-way in diverse regions of the world, including Europe and Africa. However, a lack of understanding of various elements controlling well productivity, and limitations of available tools to adequately characterize a shale gas formation and forecast production from wells drilled therein, can make it more difficult to predict likely commercial value of a project. Factors that may impact a value assessment may include, for example, drilling costs, associated number of wells to develop a shale gas region, production return that each well can deliver, etc.

Figure 2:
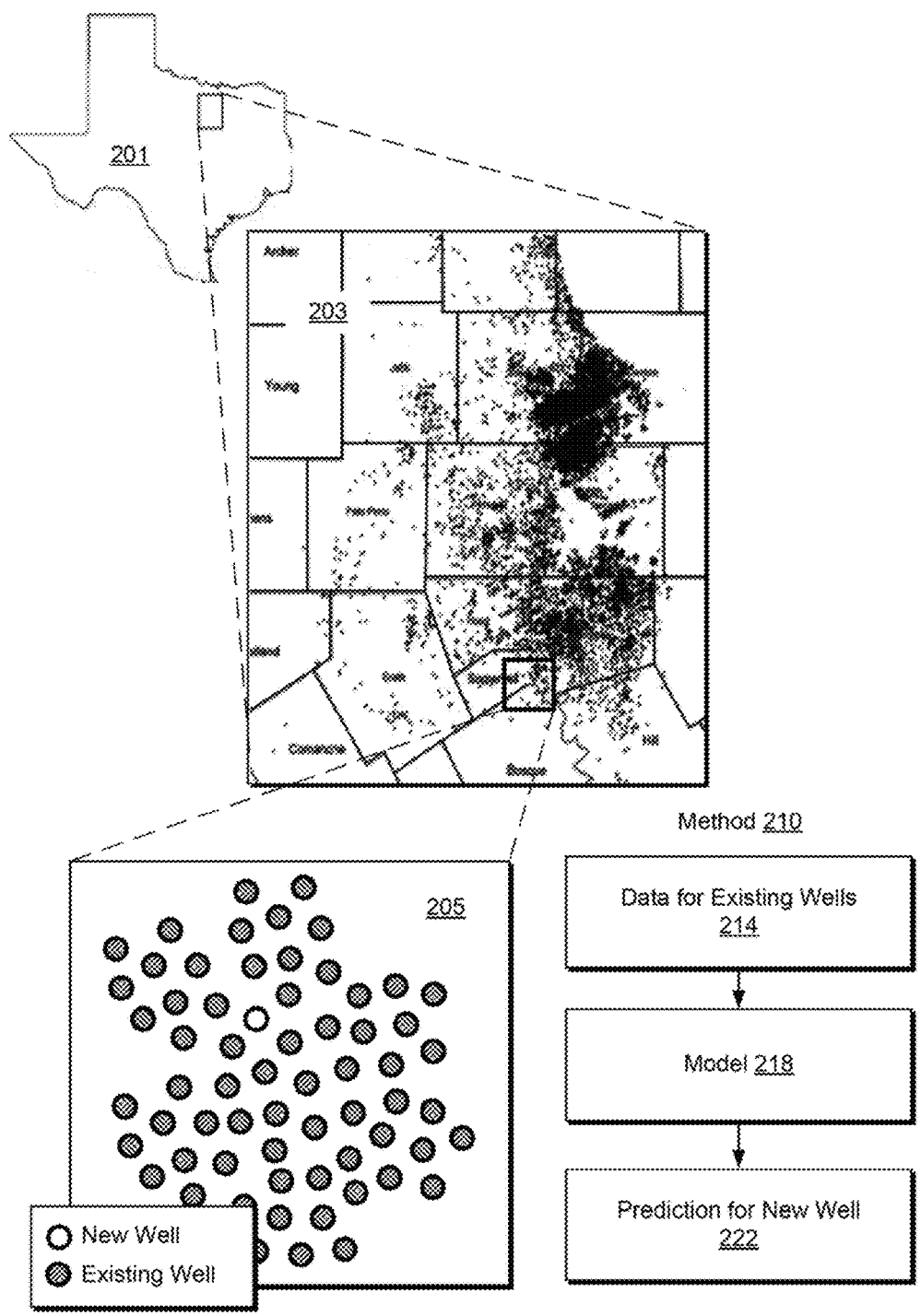
FIG. 2 illustrates an example of a geologic environment and an example of a method.

FIG. 2 shows an example of a field 201, an example of well locations 203 in the field 201, an example of a new well location with respect to existing wells 205 in the field 201 and an example of a method 210.

In the example of FIG. 2, the field 201 may be part of a geologic environment such as the Bend Arch-Fort Worth Basin. The field 201 may include the Barnett shale formation, for example, including sedimentary rocks of Mississippian age (e.g., about 354 to about 323 million years ago). The formation may underlie about 5,000 square miles (e.g., about 13,000 square kilometers), for example, where boundaries in the well locations graphic 203 may be those of counties.

Some estimates indicate that the Barnett shale formation may include as much as about $30 \times 10^{12}$ cubic feet (e.g., about 850 cubic kilometers) of natural gas resources. The Barnett shale formation may be classified, at least in part, as a "tight" gas reservoir, for example, amenable to stimulation treatment (e.g., fracturing, etc.).

The method 210 includes a data block 214 for providing data for existing wells, a model block 218 for generating a model using at least a portion of the data for the existing wells and a prediction block 222 for predicting production for a new well (e.g., an actual or a proposed new well). In such an example, a new well may be a well for which some production data are available, for example, for at least one interval of time where, for example, an interval may be a day, days, a week, weeks, a month, months, a year, years, etc.

As an example, the method 210 may include type-curve analysis. Type-curve analysis may be applied, for example, for quantifying well and reservoir parameters such as permeability, skin, fracture half-length, dual-porosity parameters, and others, by comparing pressure change and its derivative of acquired data (e.g., data for existing wells) to reservoir model curve families, called "type curves". In such an example, where a match is found between data for a well and a type curve, the parameters that characterize the behavior of the model providing a match may be deemed to have been determined. For example, where data are available for a new well for an interval of time, the data with respect to time may be used for matching a type curve where that matched type curve may be used to predict production from the new well for a future interval of time.

As with the aforementioned type-curve analysis, data mining technique may allow for analyzing quantities of data in an effort to discover meaningful patterns and relationships, which may be subsequently used for prediction. As an example, a data mining tool may include self-organizing maps (SOM), etc. Such tools may involve numerous parameters. For example, as mentioned, a type-curve analysis may include well and reservoir parameters such as permeability, skin, fracture half-length, dual-porosity parameters, and others.

As an example, an approach may be taken that involves a set of parameters that includes production parameters. As an example, a set of parameters may include, exclusively, production parameters. In one embodiment, the set includes less than about 10 parameters. As an example, a set may include about four production parameters. As an example, four production parameters may form a set of parameters for a model that can predict production.

A method may include predicting future performance of a shale gas well (e.g., future production) based on historical production data. In such an example, the method may use neural network techniques (e.g., artificial neural network techniques).

An artificial neural network may include processing elements that can exhibit global behavior determined by connections between the processing elements and element parameters. As an example, a statistical model may be considered a neural model where it includes sets of adaptive weights (e.g., parameters that may be tuned by a training algorithm) and where it is capable of approximating non-linear functions of input. As to adaptive weights, these may be conceptually viewed as "connection strengths between neurons", for example, that may be activated during training (e.g., determined) and during prediction. As an example, an artificial neural network (ANN) may include an input node layer, a hidden node layer and an output node layer with connections and weights that may be determined at least in part via training (e.g., training data of known inputs and known outputs). A trained ANN may be used for predictions, for example, by applying data to an input node layer and outputting one or more predicted values at an output node layer where a hidden node layer, connections and weights may transform the data to the one or more predicted values.

Figure 3:
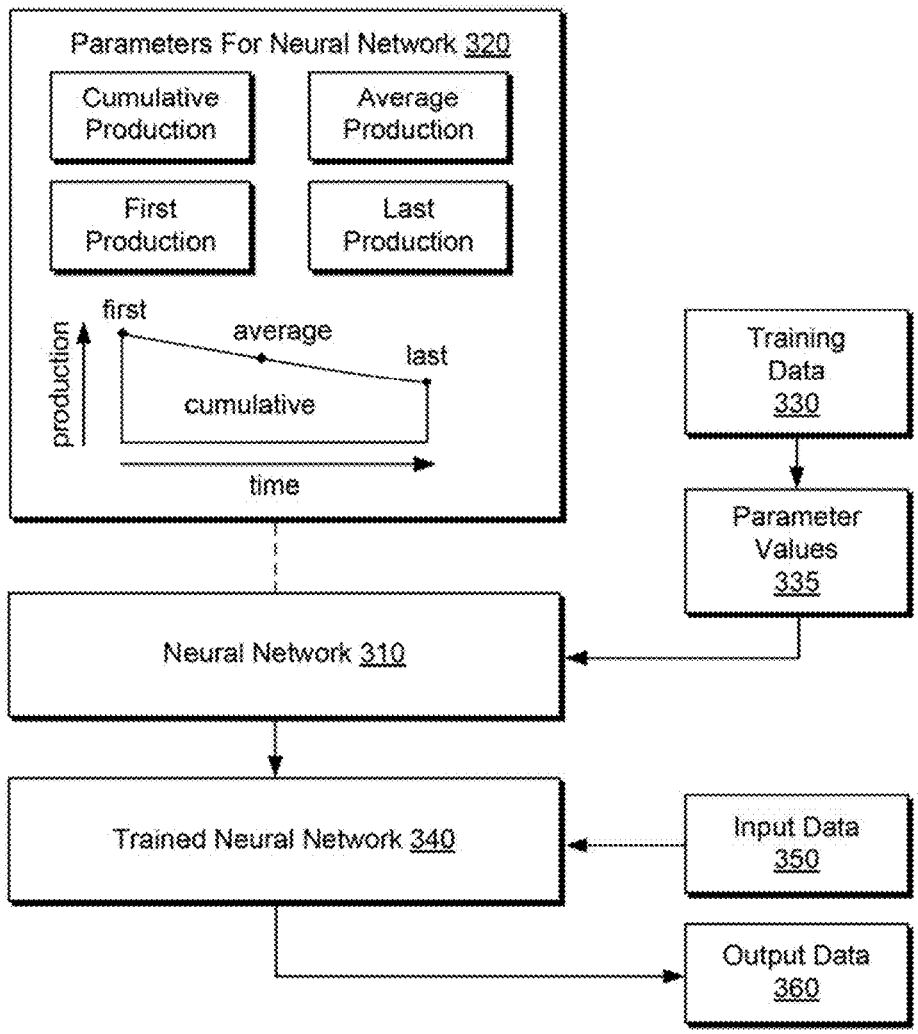
FIG. 3 illustrates an example of a method and an example of a system.

FIG. 3 shows an example of a method 300 that includes a provision block 310 for providing a neural network and an example of a system 370. In the example of FIG. 3, the neural network includes defined parameters, which are shown as a set of production parameters per a definition block 320 (e.g., for defining a set of parameters). In the example of FIG. 3, the set of production parameters includes a cumulative production parameter, an average production parameter, a first production parameter and a last production parameter, as associated with an interval, where the interval may be, for example, a time interval. As another example, an "inverse" parameter technique may define an interval as a set amount of cumulative production, for example, X cubic feet of gas where a first production parameter, a last production parameter and an average production parameter may be determined as well as a time to achieve the set amount of cumulative production. In such examples, the set of parameters may be deemed to be production-based parameters.

In the example of FIG. 3, the method 300 also includes a provision block 330 for providing training data and a transform block 335 for transforming the training data to parameter values according to the defined set of parameters of the neural network (e.g., a model). As indicated, the neural network may be trained per a training block 340, using the provided and transformed training data per the provision block 330 and transform block 335, to generate a trained neural network. As shown in the example of FIG. 3, the method 300 may include a provision block 350 for providing input data to the trained neural network of the training block 340 such that an output block 360 may output data from the trained neural network.

As an example, the method 300 may use a neural network to predict production of a well based on its performance in a previous interval. In such an example, a decline in production may be captured during a training process and applied to production data during a forecasting phase. The method 300 may implement a model with four production parameters that is able to forecast production, for example, in an unconventional play (e.g., a shale field) with reasonable tolerance. Such a method may, for example, be applied automatically to a large number of wells, used for integrated operation, etc. For example, a comparison of actual versus predicted behavior may enable operators to quickly identify a problem well for more detailed investigation. As an example, the method 300 may be implemented via one or more computer-readable media (CRM) that include instructions that may be executable by a processor (e.g., of a computer, computing system, etc.). As an example, the method 300 or one or more portions thereof may be optionally implemented as a plug-in, via an application programming interface, etc. (e.g., of a framework, a software platform, etc.).

In the example of FIG. 3, the system 370 includes one or more memory storage devices 372, one or more computers 374, one or more networks 380 and one or more modules 390. As to the one or more computers 374, each computer may include one or more processors (e.g., or cores) 376 and memory 378 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, various blocks of the method 300 may be associated with one or more modules such as, for example, the one or more modules 390 of the system 370. As an example, a module may include instructions, executable by a processor, which may be stored in a computer-readable medium (e.g., a computer-readable storage medium that is non-transitory). In such an example, execution of the instructions may cause a system to perform various acts (e.g., a method, etc.). As an example, the system 370 may be configured to output one or more control signals, for example, to control equipment (e.g., exploration equipment, production equipment, etc.).

Figure 4:
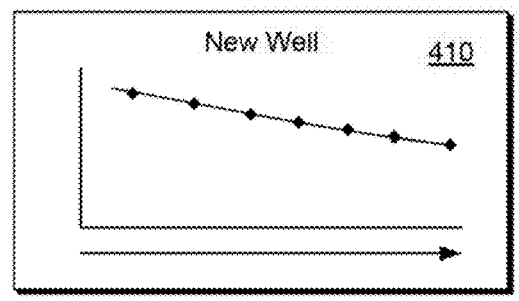
FIG. 4 illustrates an example of a method.
Figure 4:
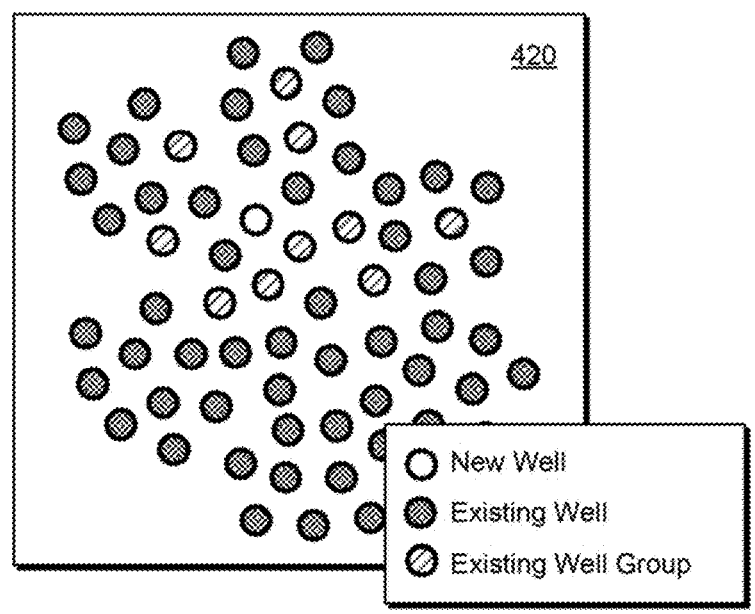
Figure 4:
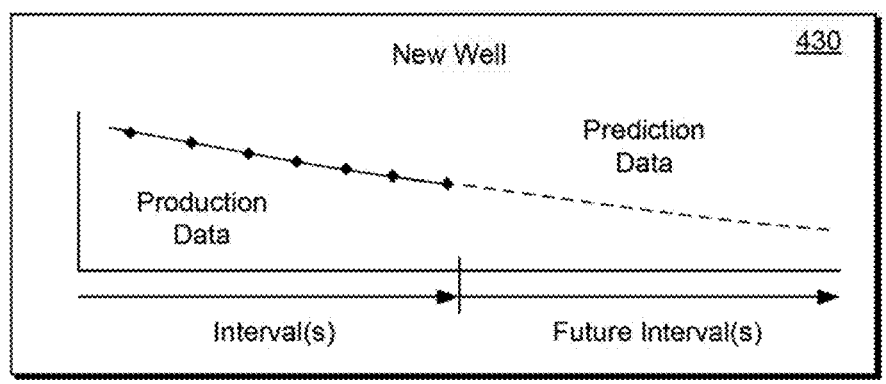

FIG. 4 shows an example of a method 400 that includes providing production values for a new well 410, providing at least one trained neural network trained using production values for a group of wells 420 and predicting production values for the new well 430. In such an example, the group of wells may include existing wells that may be characterized, for example, based on one or more factors. As an example, a trained neural network may be selected from a group of trained neural networks, for example, based at least in part on one or more well-related factors.

As an example, a method can include providing a trained neural network; providing a set of production values for production of a resource from a basin where, for example, the set includes a cumulative production value for an interval, an average production value for the interval, a first production value for the interval and a last production value for the interval; and predicting at least one production value for a subsequent interval based at least in part on the trained neural network and the provided set of production values. In such an example, the set of production values may be the cumulative production value for the interval, the average production value for the interval, the first production value for the interval and the last production value for the interval. As an example, a set of production values may be production values for a single well.

As an example, a method may include generating a trained neural network by providing historic production data for an interval and a subsequent interval and training a neural network using the provided historic production data. As an example, an interval and a subsequent interval may be time intervals measured from commencement of production of a resource from a well.

As an example, a trained neural network may be configured to predict at least one production value for an interval based on a set of production values for a prior interval, for example, where the interval and the prior interval are contiguous in time.

As an example, a trained neural network may include an input node layer, a hidden node layer and an output node layer. In such an example, the trained neural network may include node connections and weights. As an example, a resource may be gas, for example, that may be produced from a basin that includes a shale formation.

As an example, a system can include a processor; memory operatively coupled to the processor; and instructions stored in the memory and executable by the processor to predict production of a resource from a basin using input values and a set of trained neural networks where each of the neural networks in the set corresponds to a different production interval for production of the resource from the basin. In such an example, the different production intervals may be contiguous in time. As an example, input values may include a cumulative production value, an average production value, a first production value and a last production value. As an example, a set of input values may be a cumulative production value, an average production value, a first production value and a last production value.

As an example, input values for a first interval may be measured values. In such an example, output values corresponding to a second interval may be output from one of a set of trained neural networks for the first interval and where the output values are input to one of the set of trained neural networks for a second interval to output values corresponding to a third interval. In such an example, output from one trained neural network may be input for another trained neural network such that a chain is formed of trained neural networks (e.g., spanning a series of intervals).

As an example, one or more trained neural networks may be trained using training data for at least about 5 production wells. As an example, data for tens of production wells, hundreds of production wells, etc. may be used for training one or more neural network.

As an example, one or more computer-readable media can include computer-executable instructions to instruct a computing system to predict production of a resource from a basin using input values and a set of trained neural networks where each of the neural networks in the set corresponds to a different production interval for production of the resource from the basin. In such an example, each of the trained neural networks in the set of trained neural networks may include a cumulative production input parameter, an average production input parameter, a first production input parameter and a last production input parameter. As an example, to predict production may include prediction of at least a cumulative production value, for example, consider prediction of at least a cumulative production value, an average production value and a last production value for an interval.

Figure 5:
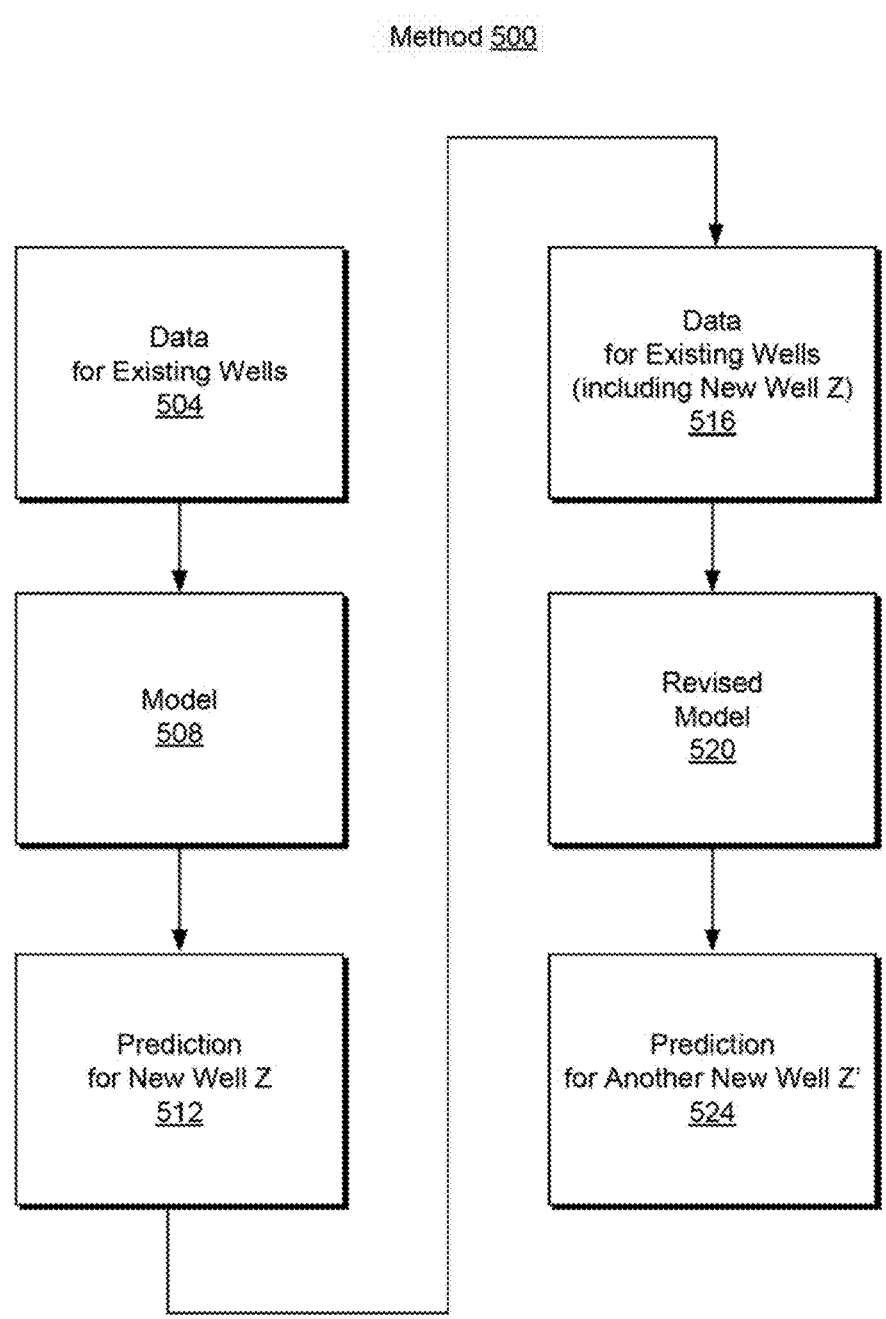
FIG. 5 illustrates an example of a method.

FIG. 5 shows an example of a method 500 that includes a provision block 504 for providing data for existing wells, a provision block 508 for providing, a model (e.g., a neural network as a model), a prediction block 512 for predicting production for a new well Z, a provision block 516 for providing data for existing wells including the well Z, a revision block 520 for revising a model (e.g., updating training of a neural network), and a prediction block 524 for predicting production for another new well Z'.

Figure 6:
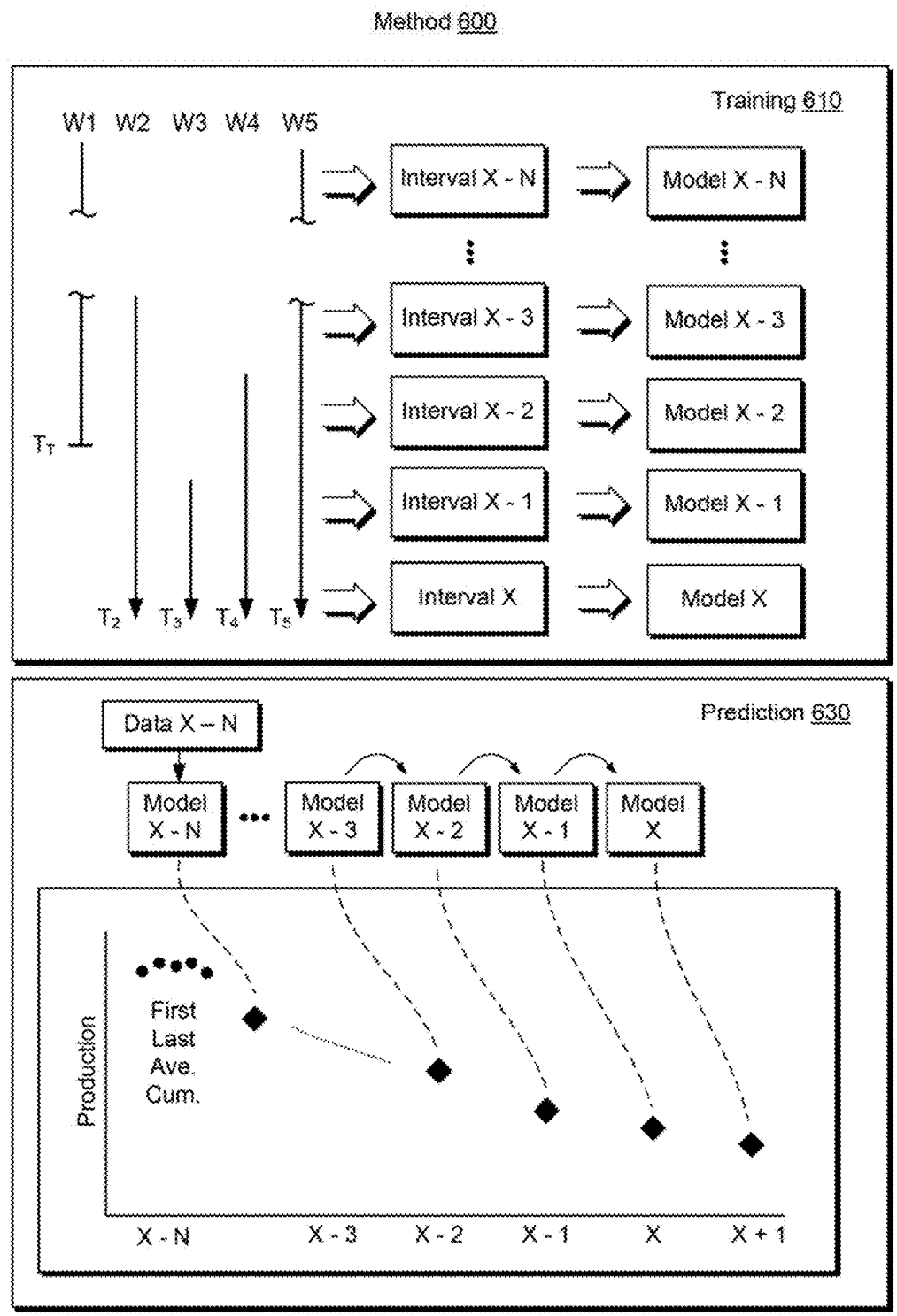
FIG. 6 illustrates an example of a method.

FIG. 6 shows an example of a method 600 that includes a training block 610 and a prediction block 630. In the example of FIG. 6, the training block 610 includes training a series of models using data for wells organized by intervals to generate a series of trained models, for example, one for each interval. As shown, the prediction block 630 may use the series of trained models and, for example, data (e.g., optionally measured data) for an interval to commence a prediction chain to predict production values for a series of intervals.

As an example, production over a period of time may be broken down into yearly intervals (e.g., or other intervals) where each year is assigned a few parameters (e.g., optionally pseudo-static parameters) which may be used to train individual neural networks (e.g., one for each interval). In such an example, after a neural network is trained it may be used to forecast production for a year 'N' based on production from a year 'N-1'. For example, a method may input data for year 'N-1' to a trained neural network such that it will output a prediction for a subsequent year 'N'.

As an example, a separate neural network may be created for each set of interval data (e.g., year data), for example, where an appropriate neural network is chosen during a forecasting phase for a particular interval and where neural network input/output may be chained.

As an example, a separate trained neural network may be generated for each interval (e.g., year) based on a "production interval" for each well, for example, if well 1 started in 2010 and well 2 started in 2011, then production data for well 1 year 2011 may be combined with production data for well 2 year 2012 as they are both "production year 2" data. For example, where production is predicted to year 10 of production, a method may use first year data as input to chain 9 neural networks, one for each production year (e.g., year 1-2, 2-3, 3-4, 4-5, 5-6, 6-7, 7-8, 8-9, 9-10).

Figure 7:
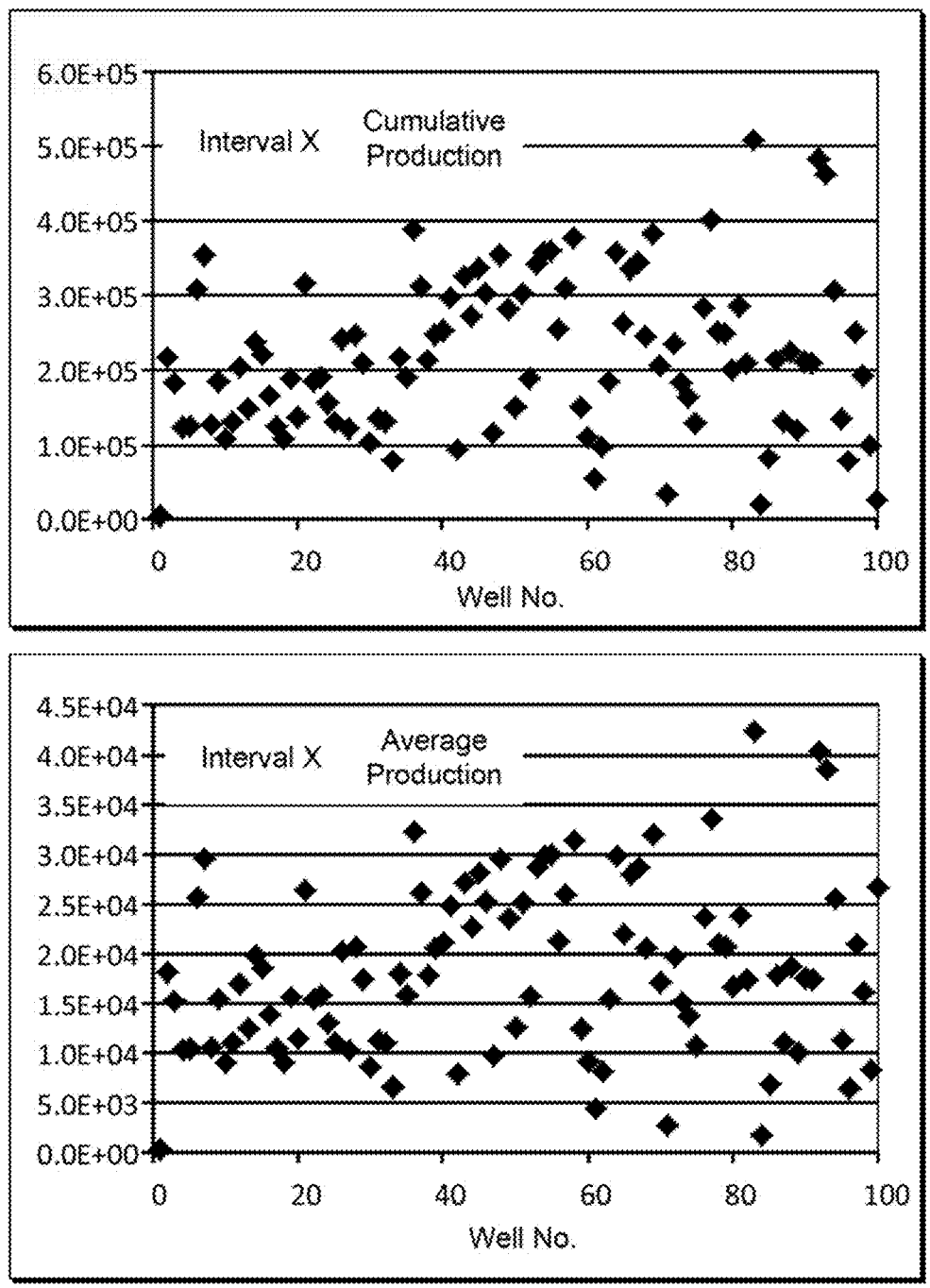
FIGS. 7 and 8 illustrate examples of data.
Figure 8:
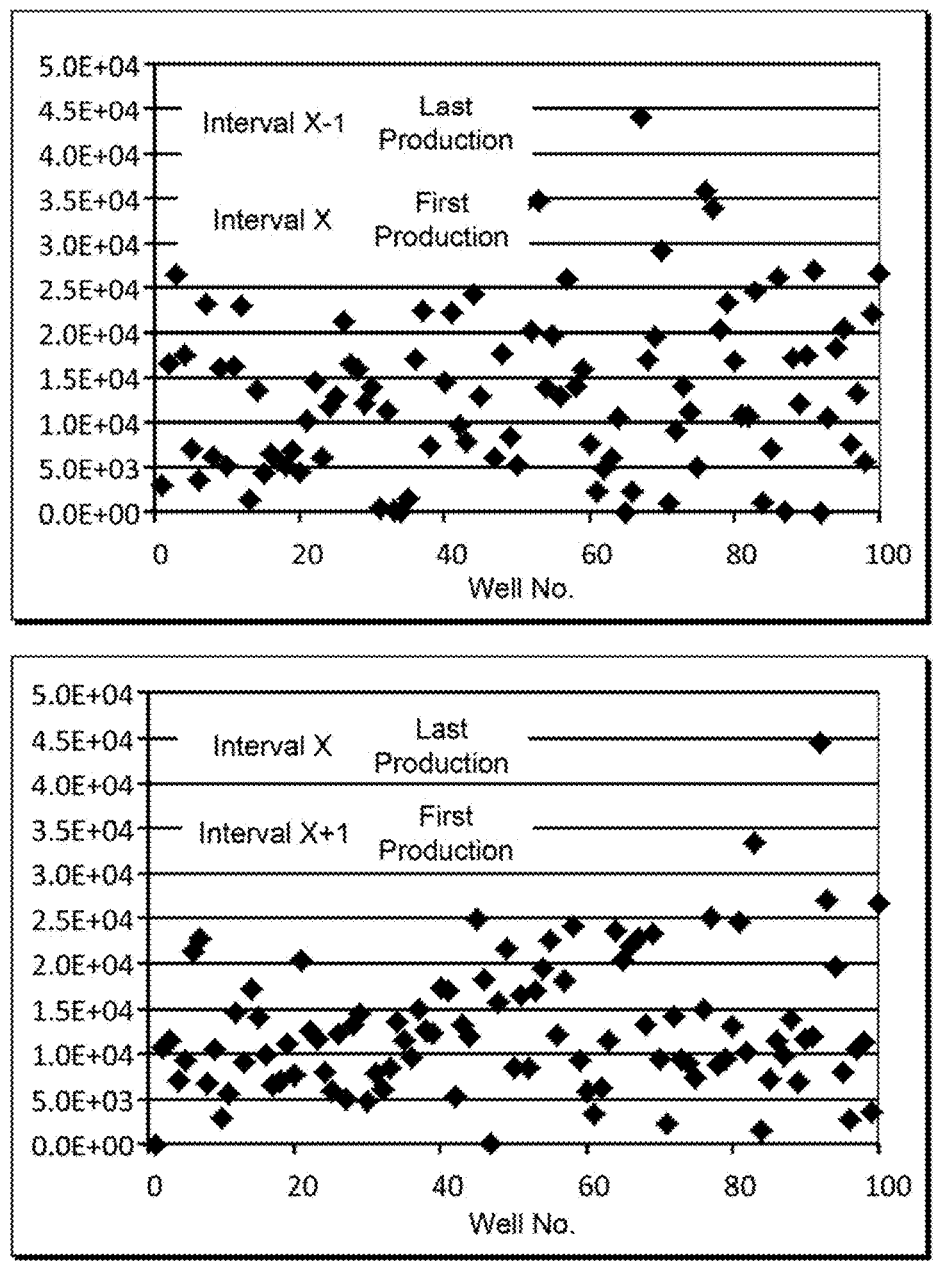

FIGS. 7 and 8 show examples plots of production data for about 100 wells for an interval X (e.g., a production year). Such data may be used, for example, as training data to train a neural network to generate a trained neural network. As an example, data from a subsequent interval may be used for training, for example, such that input and output are known, for example, for purposes of adjusting one or more weights, etc. of a neural network.

Figure 9:
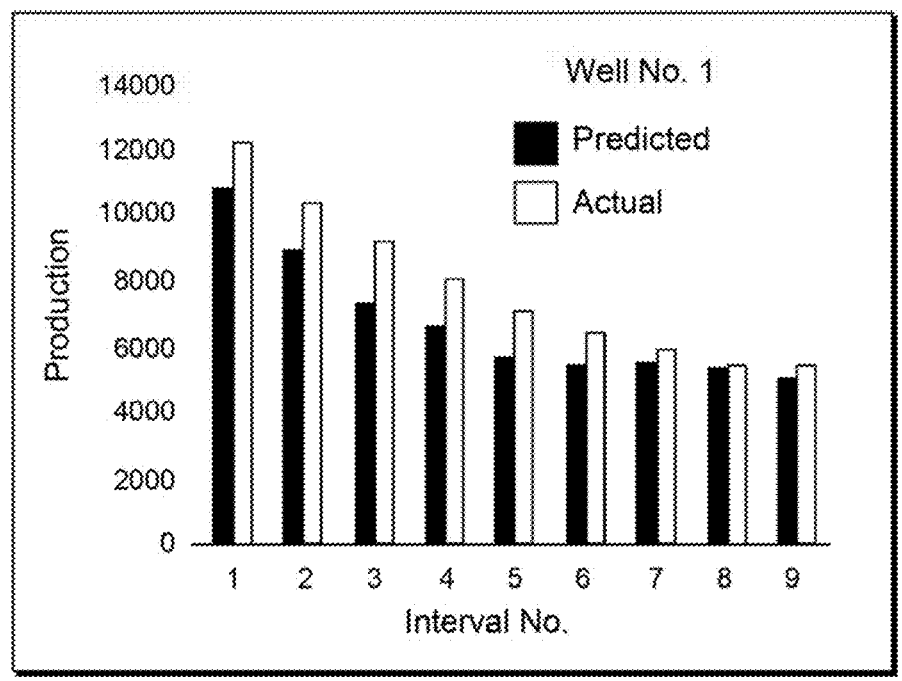
FIGS. 9, 10 and 11 illustrate examples of trial data.
Figure 9:
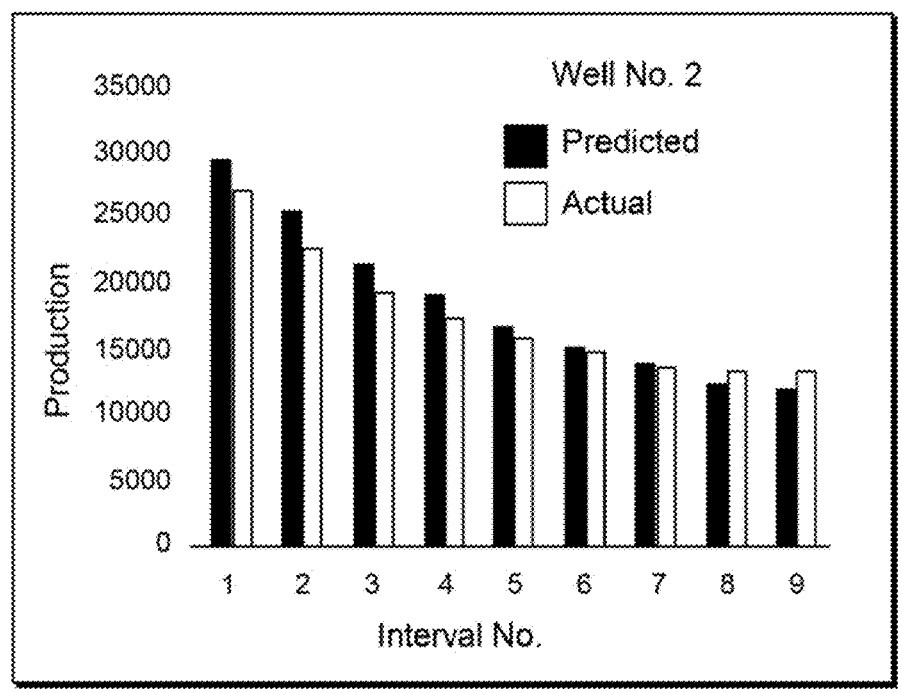
Figure 10:
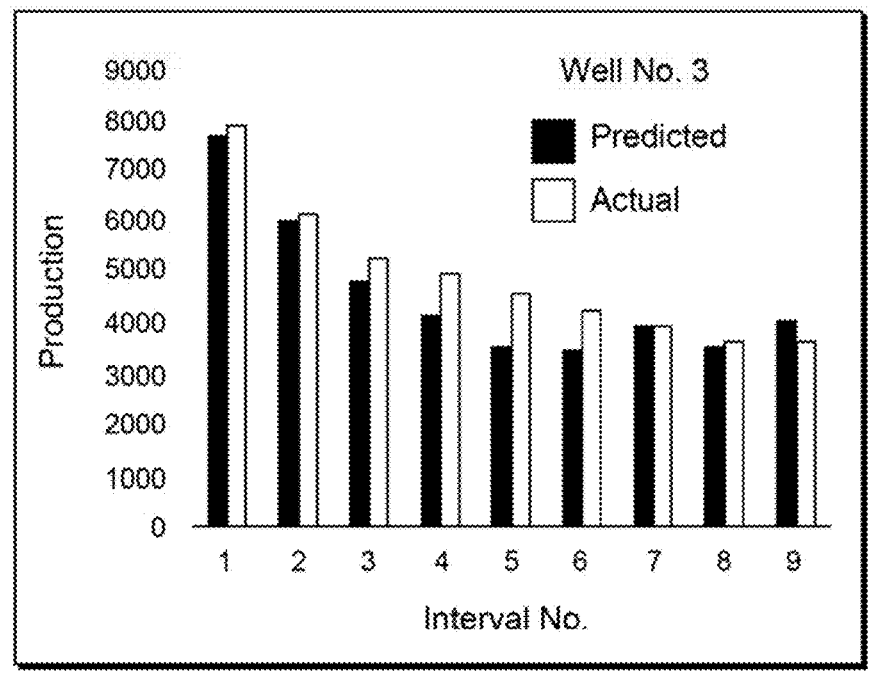
Figure 10:
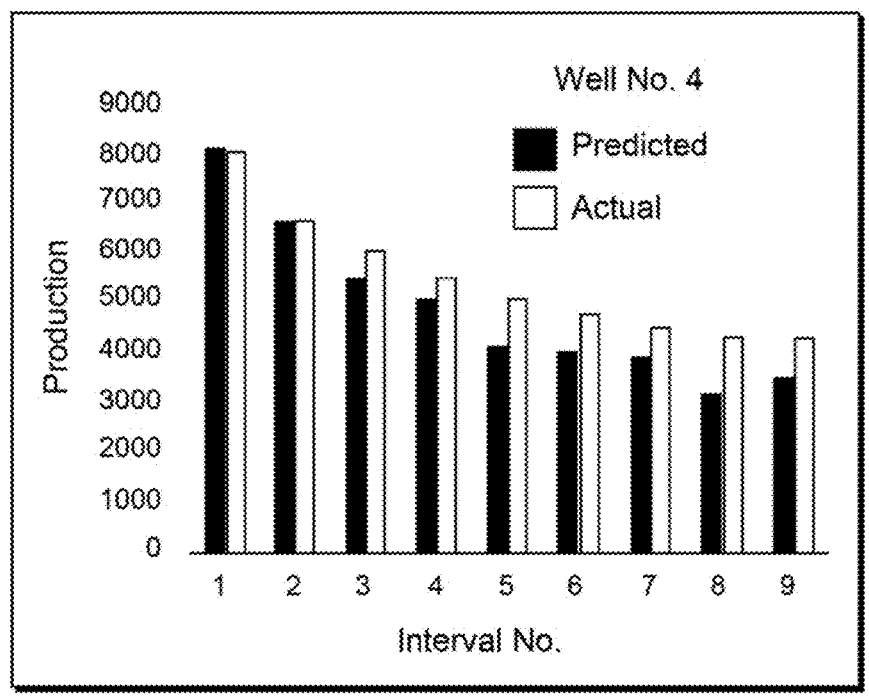
Figure 11:
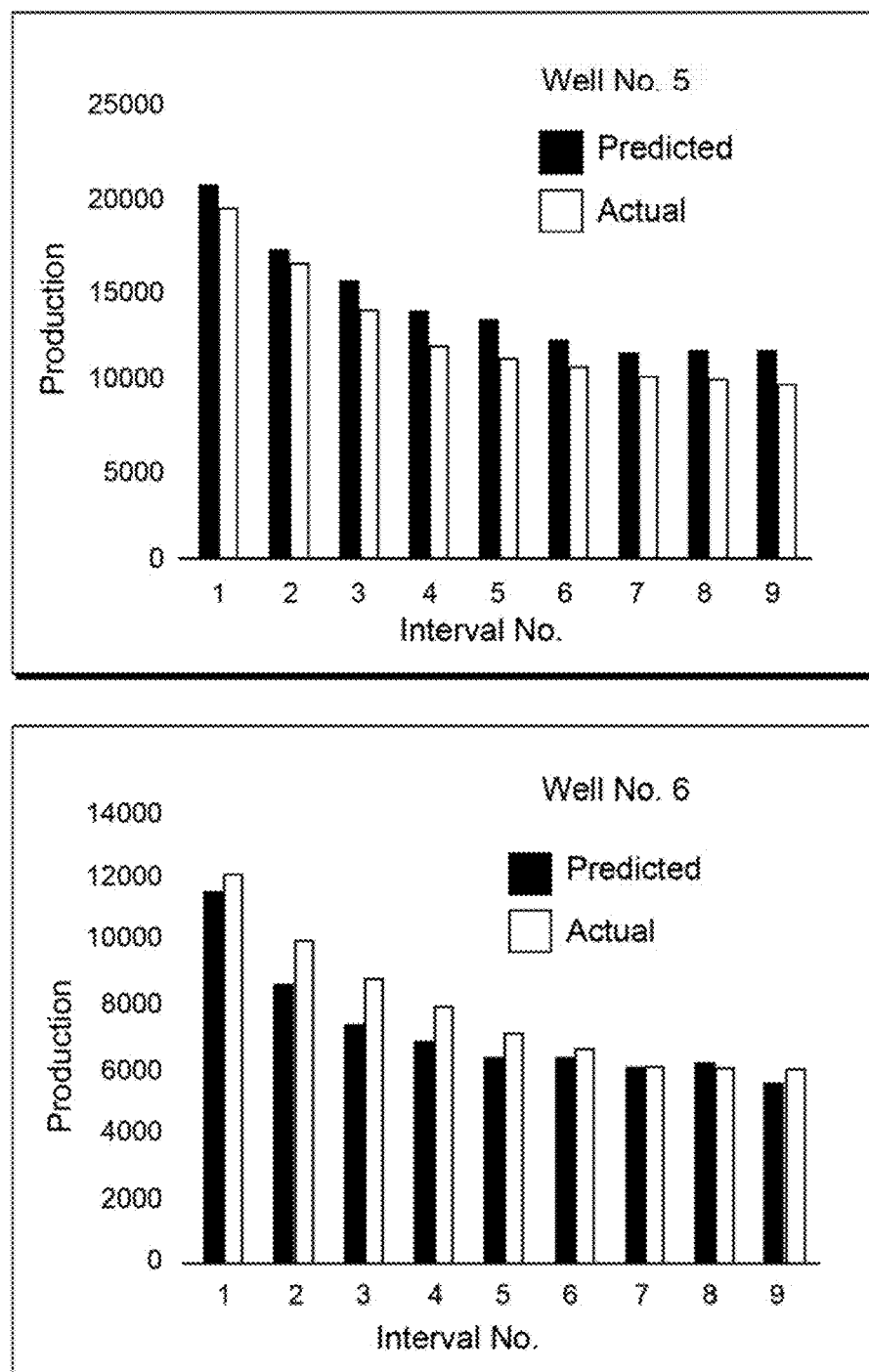

FIGS. 9, 10 and 11 shows comparison of predicted versus actual values for a trial using a series of trained neural networks. In such an example, the series of trained neural networks were trained using many wells that were then used to predict values for six wells where first year production data for each of the six wells was used as input. In the trial, the series of neural networks may be considered as forming a daisy-chain, for example, where output of the first feeds into the input of the second and so on. In such an example, the last production value of year N-1 may be used as the first production value of N, for example, such that the value is copied over (e.g., not computed with using a subsequent neural network).

As an example, production from a shale gas well may carry an underlying signature of a reservoir and completion characteristic. A workflow may include using production data, for example, for training and implementing one or more neural networks such that the workflow may predict production values (e.g., future values).

As an example a method may be implemented at least in part using a framework. In such an example, the framework may include various features of the AVOCET® production operations software platform (Schlumberger, Houston, Tex.). The AVOCET® platform includes features for workflow automation, online artificial lift management, predictive data analysis for candidate selection, web-based key performance indicators visualization for review of operations, etc.

The AVOCET® platform can connect to engineering simulation models and analytical applications, for example, to provide insight into root causes of production shortfalls, to improve production operations management, etc. The AVOCET® platform may provide features that allow for consideration of a broad range of asset disciplines. The AVOCET® platform may integrate well operations and production management systems, for example, including capture and validation of field data, production, and equipment surveillance and tracking specialized oilfield operations. The AVOCET® platform includes functionality for unification of various data, which may be data from disparate data sources, as well as bridging such data with one or more engineering models in user environment that allows users to identify problems more quickly, minimizing downtime and enabling continuous production optimization.

As an example, a production operations platform may benefit field staff, production and reservoir engineers, production accountants, administrators, etc. One or more graphical user interfaces may be contextualized to view asset performance, monitor KPIs, visualize relevant information that can affect production, impact performance, etc. As an example, performance metrics may be visualized, including allocated production against plan for a full portfolio of assets. As an example, a programming framework (e.g., the MICROSOFT® SILVERLIGHT® framework marketed by Microsoft Corp., Redmond, Wash.) may support access to a production operations platform, for example, via a network (e.g., the Internet) for data entry, validation, contextualization, viewing of information (e.g., in the field, office, mobile device, etc., where underlying platforms, operating systems, etc., may differ).

As an example, production over a period of time may be broken down into yearly intervals where each year is assigned a few pseudo-static parameters which are used to train a neural network. After the neural network is trained it may be used to forecast production for year 'N' based on production from year 'N-1'. A separate neural network may be trained for each set of year and a particular one chosen during a forecasting phase. As an example, after a decline rate becomes relatively constant, a neural network (e.g., one of a group of trained neural networks) may be used to predict beyond a training time period.

As an example, for training a neural network, 4 parameters may be used: Cumulative Production, Average Production, First Production and Last Production (e.g., for each interval). In such an example, the First Production for a next interval may be the same as the Last Production of a prior interval (e.g., such that 3 outputs are generated by each neural network for 4 inputs).

As mentioned, a trial was performed after neural networks were trained, in part, for purposes of validation (e.g., for wells from the Barnett shale formation/field). In the trial, first year production was considered as an input; noting that real production data for subsequent years was available and used for comparison purposes. Results are shown in FIGS. 9, 10 and 11 for wells 1 to 6. As seen in the plots of FIG. 9 (well numbers 1 and 2), FIG. 10 (well numbers 3 and 4) and FIG. 11 (well numbers 5 and 6), predicted and the actual results are within about 5% tolerance for up to 10 years of forecast (e.g., using an interval of about a year). As shown in FIGS. 9, 10 and 11, the approach may provide for assessment of wells, for example, where such wells may vary in production (e.g., with respect to each other).

As an example, a workflow or workflows may include one or more trained neural networks for purposes of predicting production. As an example, a framework may provide for data loading and formulating variables to train one or more neural networks, optionally in an automated fashion. As an example, training may include human interaction where, for example, after such interaction, an automated workflow may continue and, for example, generate one or more forecasts (e.g., optionally for new wells that may have some available production data).

As an example, a method can include data mining to predict production, for example, as to one or more unconventional reservoirs. Such a method may leverage the value of production data.

As an example, one or more methods described herein may include associated computer-readable storage media (CRM) blocks. Such blocks can include instructions suitable for execution by one or more processors (or cores) to instruct a computing device or system to perform one or more actions.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 12:
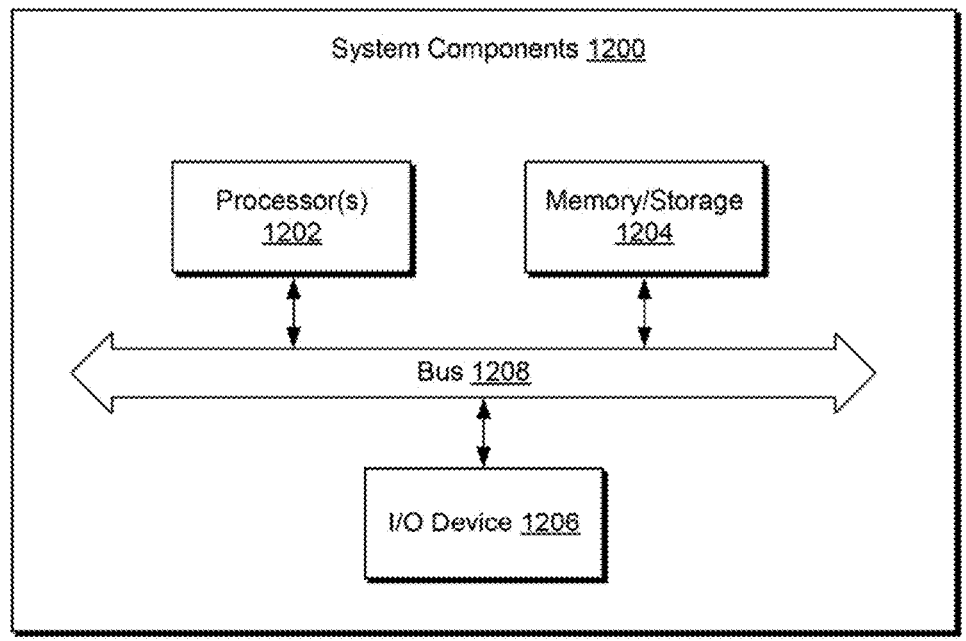
FIG. 12 illustrates example components of a system and a networked system.
Figure 12:
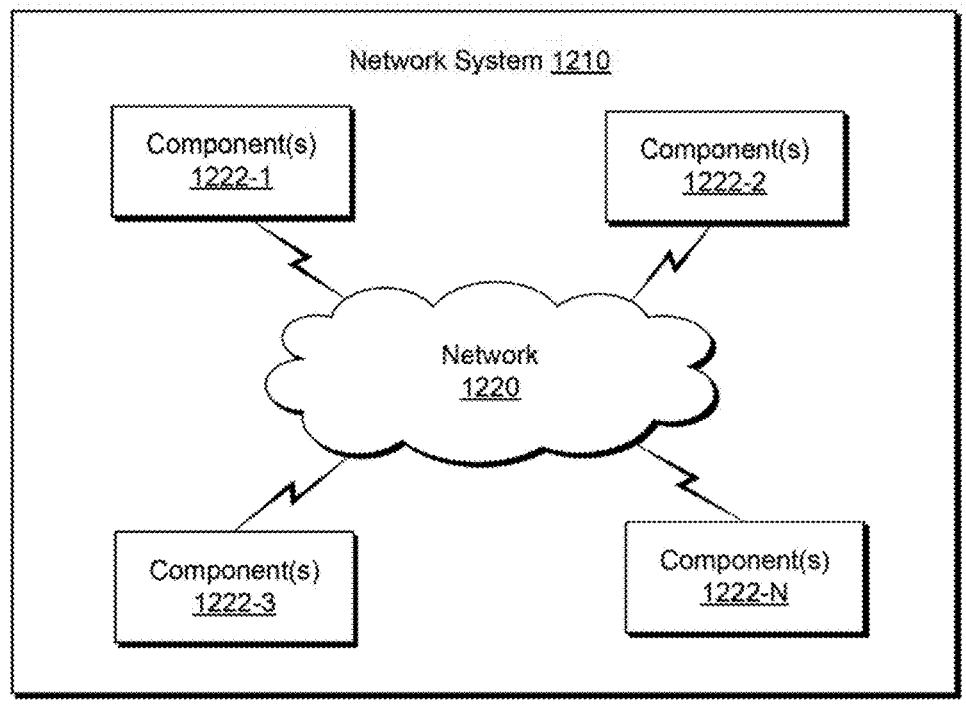

FIG. 12 shows components of a computing system 1200 and a networked system 1210. The system 1200 includes one or more processors 1202, memory and/or storage components 1204, one or more input and/or output devices 1206 and a bus 1208. According to an embodiment, instructions may be stored in one or more computer-readable media (e.g., memory/storage components 1204). Such instructions may be read by one or more processors (e.g., the processor(s) 1202) via a communication bus (e.g., the bus 1208), which may be wired or wireless. The one or more processors may execute such instructions to implement (wholly or in part) one or more attributes (e.g., as part of a method). A user may view output from and interact with a process via an I/O device (e.g., the device 1206). According to an embodiment, a computer-readable medium may be a storage component such as a physical memory storage device, for example, a chip, a chip on a package, a memory card, etc.

According to an embodiment, components may be distributed, such as in the network system 1210. The network system 1210 includes components 1222-1, 1222-2, 1222-3, . . . 1222-N. For example, the components 1222-1 may include the processor(s) 1202 while the component(s) 1222-3 may include memory accessible by the processor(s) 1202. Further, the component(s) 1202-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.), As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

CONCLUSION

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A computer-implemented method comprising:
providing a series of trained neural networks wherein each of the trained neural networks corresponds to a different time interval of a series of time intervals corresponding to production of a resource from a basin up to a production time;
selecting one of the time intervals that is less than the production time;
providing a set of production values for production of the resource from the basin for a well wherein the set consists of a cumulative production value for the selected time interval, an average production value for the selected time interval, a first production value for the selected time interval and a last production value for the selected time interval; and
predicting production values for the well for subsequent time intervals that are each less than or equal to the production time based at least in part on the series of trained neural networks and the provided set of production values, wherein predicted production values corresponding to a second interval are output from one of the series of trained neural networks for a first interval and wherein the predicted production values corresponding to the second interval are input to one of the series of trained neural networks for a second interval to output values corresponding to a third interval.

2. The method of claim 1 wherein the set of production values comprise production values for a single well.

3. The method of claim 1 wherein the selected time interval and the subsequent time intervals comprise time intervals measured from commencement of production of the resource from a well.

4. The method of claim 1 wherein each of the trained neural networks is configured to predict at least one production value for a time interval based on a set of production values for a prior time interval.

5. The method of claim 4 wherein the time interval and the prior time interval are contiguous in time.

6. The method of claim 1 wherein each of the trained neural networks comprises an input node layer, a hidden node layer and an output node layer.

7. The method of claim 6 wherein each of the trained neural network comprises node connections and weights.

8. The method of claim 1 wherein the resource comprises gas and wherein the basin comprises a shale formation.

9. A system comprising:
a processor;
memory operatively coupled to the processor; and
instructions stored in the memory and executable by the processor to
provide a series of trained neural networks wherein each of the trained neural networks corresponds to a different time interval of a series of time intervals corresponding to production of a resource from a basin up to a production time;
select one of the time intervals that is less than the production time;
provide a set of production values for production of the resource from the basin for a well wherein the set consists of a cumulative production value for the selected time interval, an average production value for the selected time interval, a first production value for the selected time interval and a last production value for the selected time interval; and
predict production values for the well for subsequent time intervals that are each less than or equal to the production time based at least in part on the series of trained neural networks and the provided set of production values, wherein predicted production values corresponding to a second interval are output from one of the series of trained neural networks for a first interval and wherein the predicted production values corresponding to the second interval are input to one of the series of trained neural networks for a second interval to output values corresponding to a third interval.

10. The system of claim 9 wherein the production values comprise measured values for a first interval.

11. The system of claim 9 wherein the set of trained neural networks are trained using training data for at least 5 production wells.

12. One or more non-transitory computer-readable media comprising computer-executable instructions to instruct a computing system to
provide a series of trained neural networks wherein each of the trained neural networks corresponds to a different time interval of a series of time intervals corresponding to production of a resource from a basin up to a production time;
select one of the intervals that is less than the production time;
provide a set of production values for production of the resource from the basin for a well wherein the set consists of a cumulative production value for the selected time interval, an average production value for the selected time interval, a first production value for the selected time interval and a last production value for the selected time interval; and
predict production values for the well for subsequent intervals that are each less than or equal to the production time based at least in part on the series of trained neural networks and the provided set of production values, wherein predicted production values corresponding to a second interval are output from one of the series of trained neural networks for a first interval and wherein the predicted production values corresponding to the second interval are input to one of the series of trained neural networks for a second interval to output values corresponding to a third interval.

13. The one or more non-transitory computer-readable media of claim 12 wherein the resource comprises gas and wherein the basin comprises shale.

14. The one or more non-transitory computer-readable media of claim 12 wherein to predict production comprises prediction of at least a cumulative production value.

* * * * *